Aug. 25, 1964  G. B. DOREY  3,145,664
GATE LATCHING MEANS FOR A HOPPER DISCHARGE OUTLET STRUCTURE
Filed Sept. 26, 1962  8 Sheets-Sheet 8
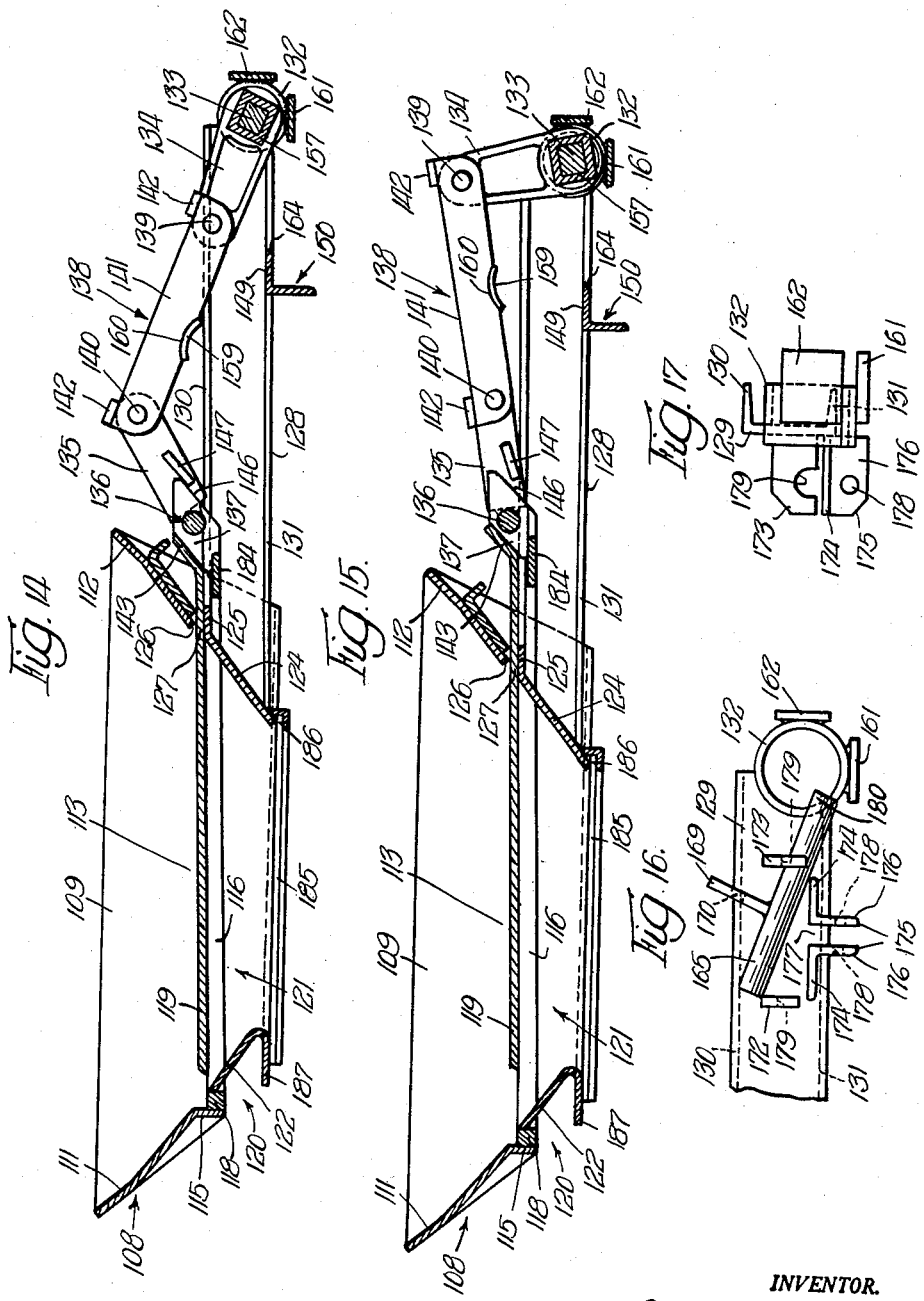
INVENTOR.
George B. Dorey,
BY
Robert R. Lockwood
atty

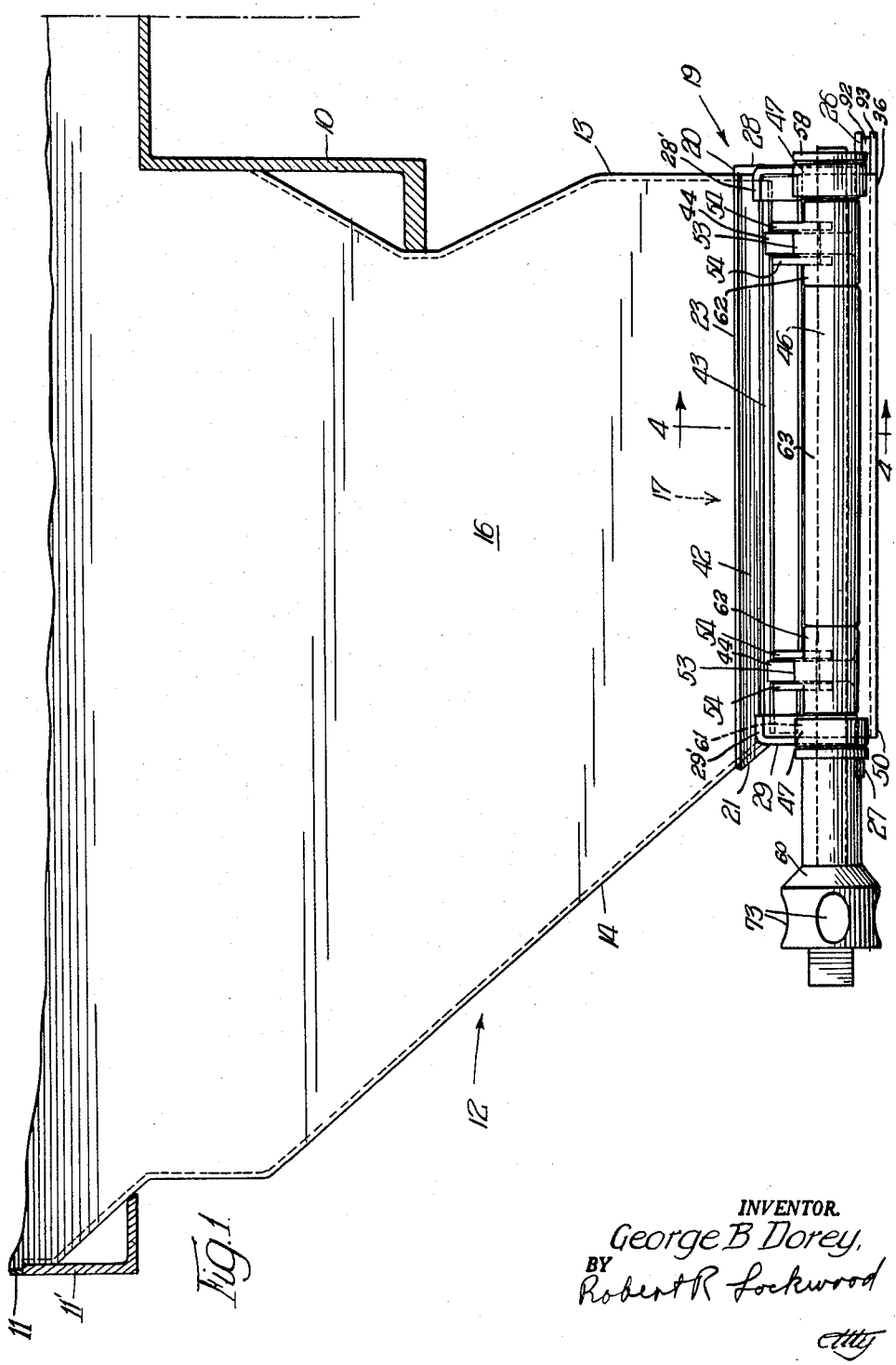

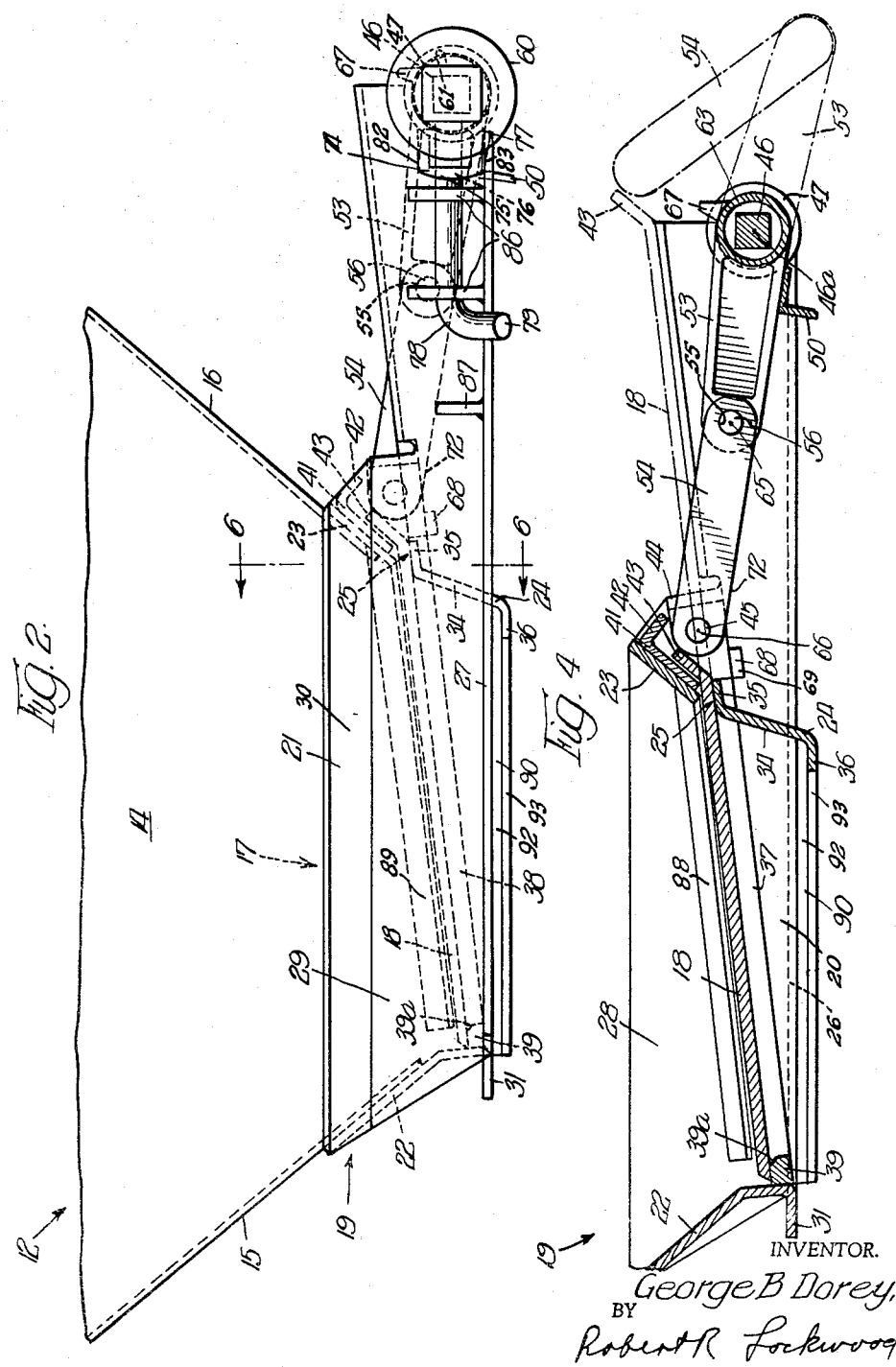

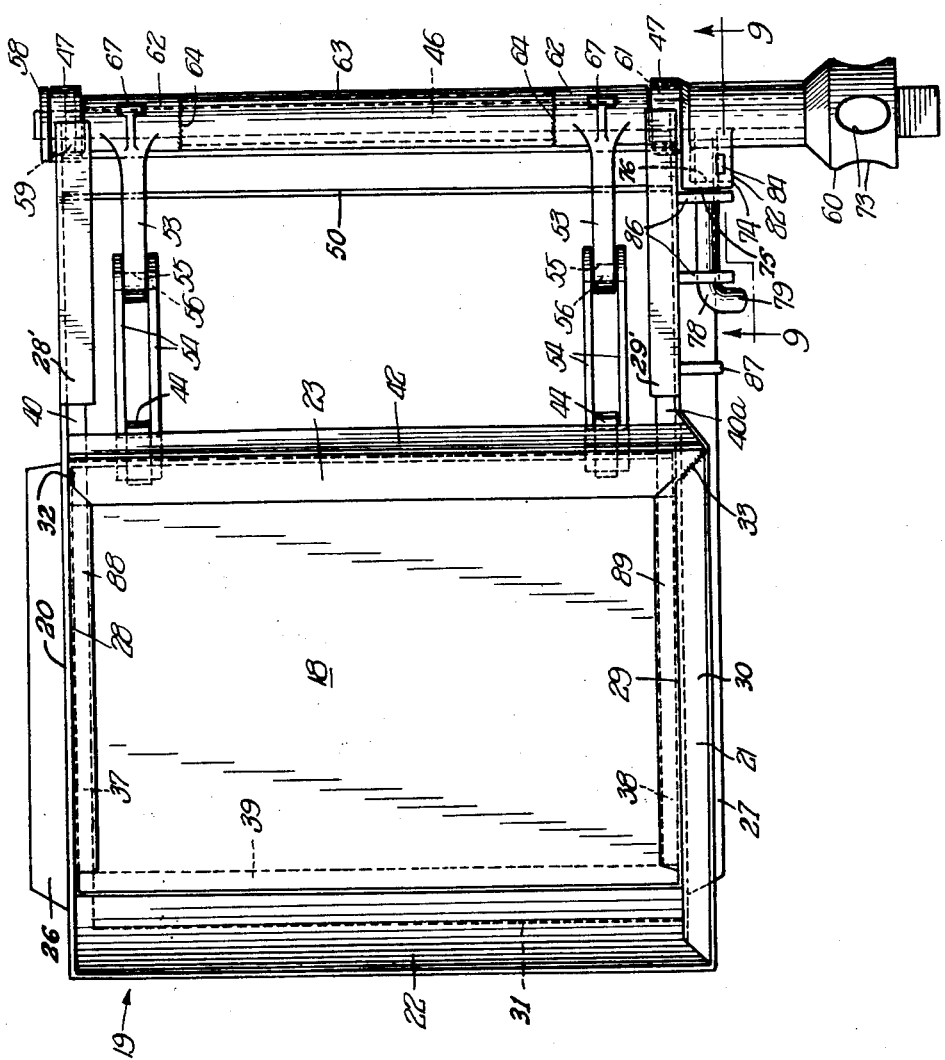

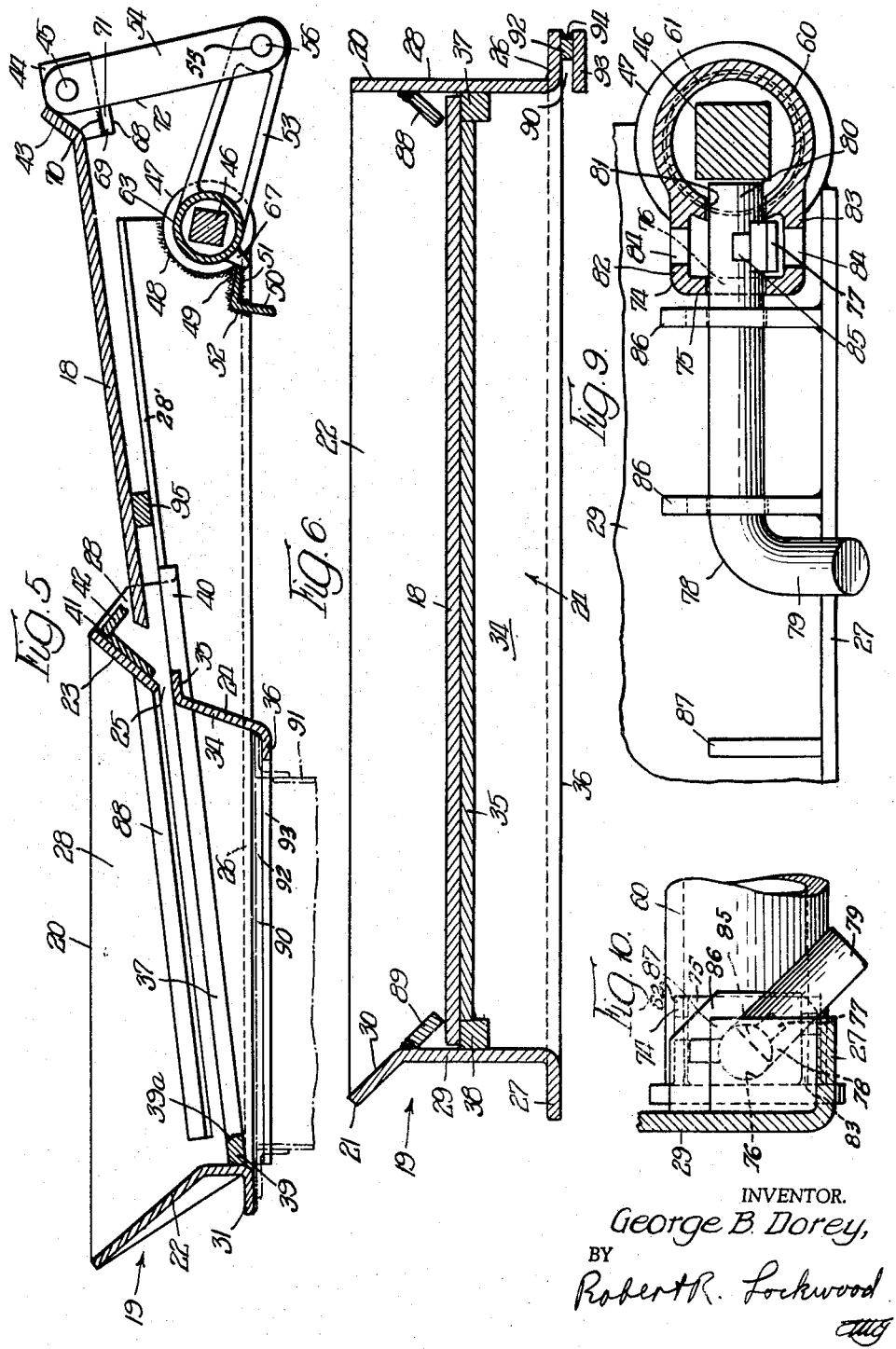

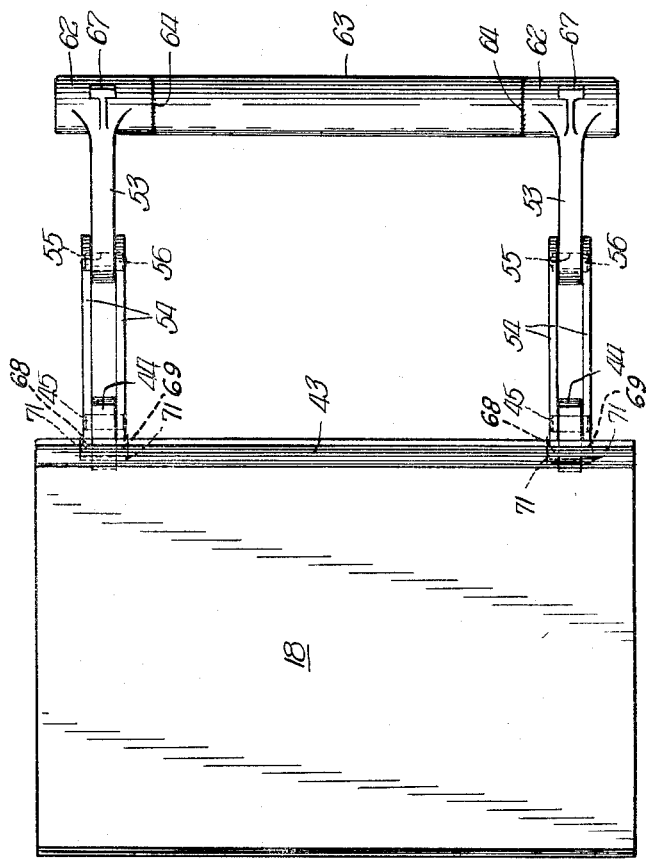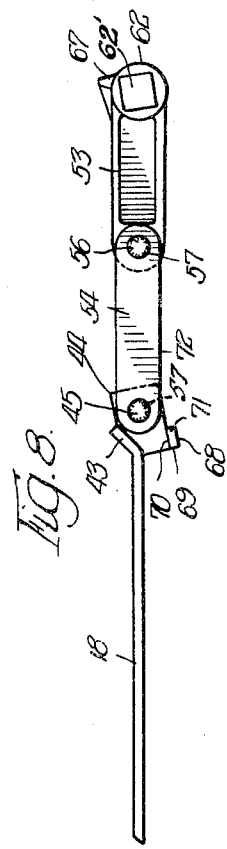

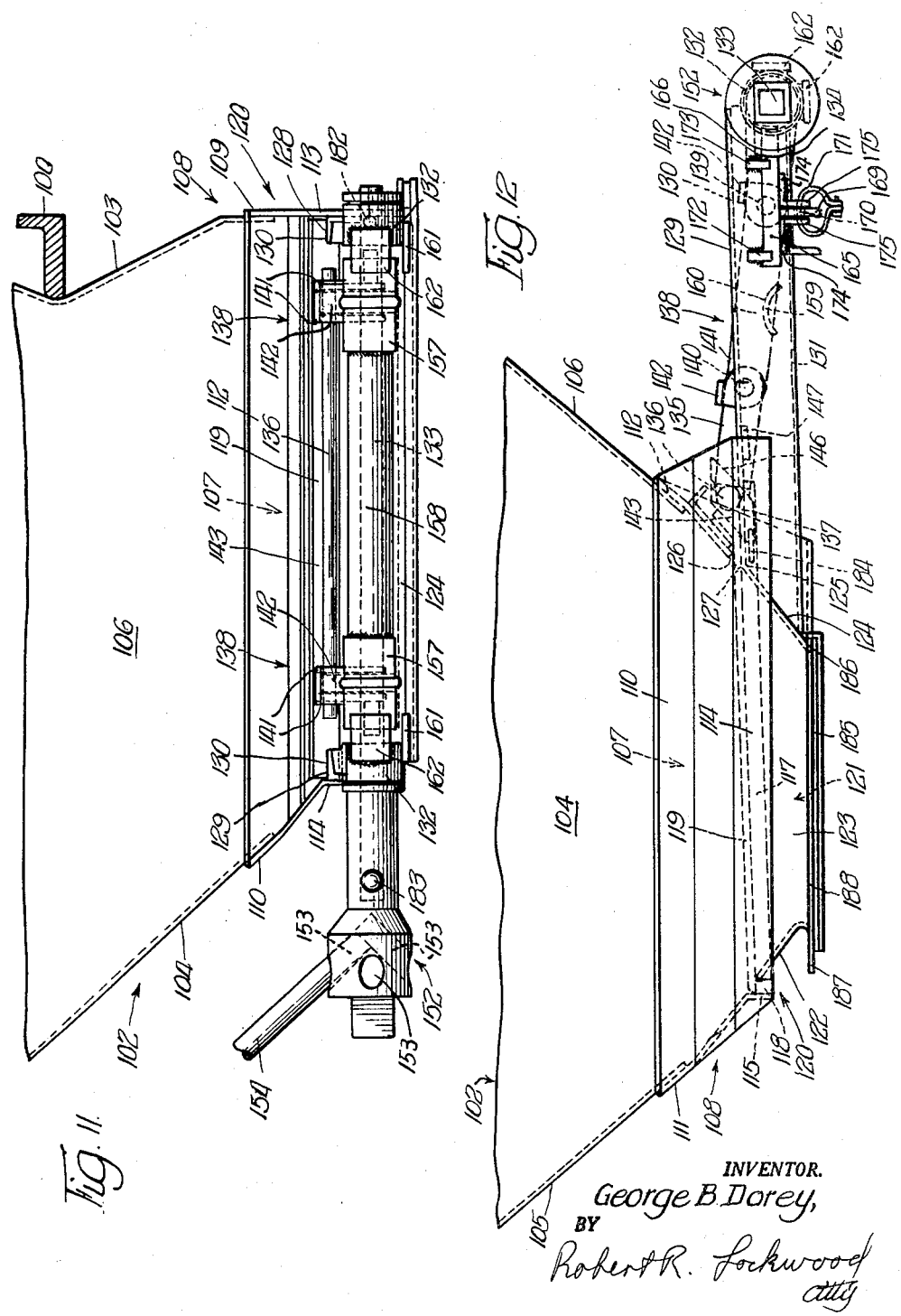

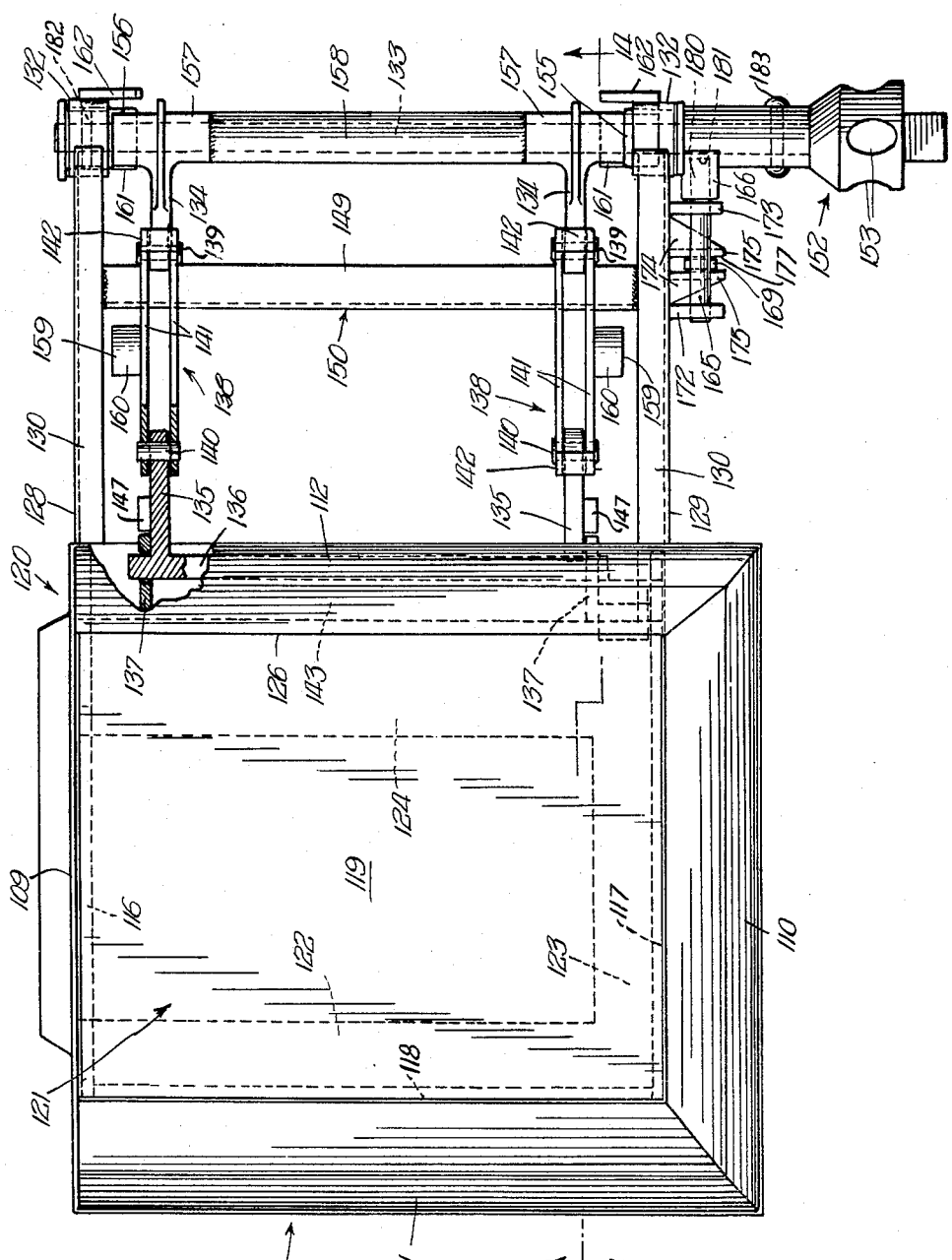

United States Patent Office 3,145,664
Patented Aug. 25, 1964

3,145,664
GATE LATCHING MEANS FOR A HOPPER
DISCHARGE OUTLET STRUCTURE
George B. Dorey, 540 Cote St. Antoine Road,
Westmount 6, Quebec, Canada
Filed Sept. 26, 1962, Ser. No. 226,338
12 Claims. (Cl. 105—253)

The invention relates to an improved hopper discharge outlet structure of the type employing a sliding gate for closing a discharge opening and is of particular importance in connection with the discharge opening of railway hopper cars and the like.

The objects of the invention, among others, are: To provide for locking a shaft, connected to move a gate of a hopper discharge outlet structure, against rotation in a new and improved manner; to employ a sliding bolt for accomplishing the locking function; to provide a socket on the shaft operating head for receiving the sliding bolt; to provide a key shaped portion on the end of the sliding bolt that enters the socket with the latter having a similarly shaped opening for receiving the key shaped end of the bolt; to provide spaced walls for limiting the endwise movement of the bolt which is generally L-shaped the short arm of which provides a handle while the long arm has the key shaped end; to provide registering apertures in the walls of the socket and in the key shaped portion for receiving a sealing band; to provide a T-shaped bolt with one end of the head arranged to enter the socket on the shaft operating head and the stem providing a handle; to provide spaced bearing walls for mounting the head of the T-shape and cooperating with the stem to limit its movement; to provide additional spaced walls for receiving the stem therebetween when the T-shaped bolt is in locking position for holding it in such position; and to provide registering apertures in the stem and the walls between which it is confined for receiving a sealing band.

For further comprehension of the invention, reference may be had to the accompanying drawings wherein the improvement is shown as applied to a railway hopper car.

In said drawings,

FIG. 1 is a vertical transverse sectional view taken through the lower part of a hopper car and showing approximately one half the width of the car.

FIG. 2 is a vertical side elevational view of the structure shown in FIG. 1 as seen from left to right.

FIG. 3 is a plan view of FIG. 2 with the floor sheets, sloping floors and car structure eliminated to better illustrate the structure.

FIG. 4 is a longitudinal vertical sectional view taken on a line 4—4 of FIG. 1 and showing in conventional dot and dash lines the position of the parts with the gate in open position.

FIG. 5 is a longitudinal vertical sectional view similar to FIG. 4 except that the gate is shown in elevated and fully withdrawn position to provide cleaning access to the interior of the hopper through the slotted end of the frame.

FIG. 6 is a transverse sectional view through the outlet assembly as seen on a line 6—6 of FIG. 2.

FIG. 7 is a plan view of the gate and mechanism assembly as seen in detached relation.

FIG. 8 is a side elevational view of FIG. 7.

FIG. 9 is a fractional vertical sectional view on an enlarged scale as taken on a line 9—9 of FIG. 3.

FIG. 10 is a vertical elevational end view of the structure shown in FIG. 9 as viewed from left to right.

FIG. 11 is a side elevational view of the lower portion of a hopper car showing as much of the car as necessary to show the application of a modified form of the gate sealing means as applied to a modified form of the outlet structure.

FIG. 12 is a vertical and elevational view of the structure shown in FIG. 11 as viewed from left to right.

FIG. 13 is a plan view of FIG. 11 with the hopper walls and car structure eliminated and certain parts broken away to better illustrate the construction, the gate being shown in closed position.

FIG. 14 is a longitudinal vertical sectional view taken on a line 14—14 of FIG. 13 showing the gate with the operated shaft in arrested position and the operating arms and linkage in overcenter toggle locked position.

FIG. 15 is another vertical longitudinal sectional view similar to FIG. 14 except that the mechanism is shown as positioned when the gate moves freely in a closing direction which is also the position of the linkage during the early stage of the opening movement.

FIG. 16 is a fractional vertical longitudinal view showing the end of the outer rail extension without the operating shaft and illustrating the method of threading the locking bolt in place prior to the assembly of the shaft in the structure.

FIG. 17 is an end elevational view of the structure shown in FIG. 16 with the locking bolt eliminated.

In said drawings the car structure is indicated by a center sill member 10 and side wall 11 above a side sill 11' and lying between said center sill member and side wall is a hopper 12. The hopper 12 is generally formed by inner and outer side walls 13 and 14 which meet with oppositely sloping floors 15 and 16 to form a four-sided hopper having a discharge area 17.

The discharge area is fitted with a sliding gate 18 and the gate in turn is slidably mounted in a frame 19 which borders the discharge area. The frame 19 preferably includes inner and outer longitudinally extending side members 20 and 21 which are united with transversely extending members 22, 23 and 24, the members 23 and 24 being separated by an intervening space to define a slot 25 through which the gate 18 extends. The side members 20 and 21 are formed of sheet metal plates and have outwardly flanged lower margins as indicated at 26 and 27 respectively and include vertically extending sections 28 and 29 between which the gate 18 slides and is guided.

The upper part of wall 29 is flanged outwardly at an incline as at 30 to underlie the outer side wall 14 of the hopper and the upper part of wall 28 overlies the inner side wall of the hopper. The transversely extending end wall 22 is likewise flanged outwardly at its lower margin to present an outwardly extending flange 31 and is also flanged outwardly and upwardly to overlie the sloping floor 15.

The upper transversely extending wall 23 extends between the upper portion of members 28 and 20 and is welded thereto as indicated at 32 and 33 and the lower transversely extending wall 24 is of generally Z shape including a web portion 34 and upper and lower flanges indicated at 35 and 36 respectively. The upper flange 35 underlies the gate and the lower flange 36 extends below the level of the lower flanges 26 and 27 a sufficient distance to admit the entrance of a flange of removable chute as will hereinafter be described.

There are provided ledges on three sides of the opening as indicated at 37, 38 and 39 which in combination with upper flange 35 provide a four-sided continuous support for the gate in closed position. The ledges 37 and 38 are respectively carried by vertical portions of the side members 20 and 21 and the ledge 39 is carried by the transversely extending wall 22. The side ledges 37 and 38 slope downwardly to bias the gate towards closed position and said ledges extend well beyond the slot 25 and join with flanges 40 and 40a which extend laterally inwardly from the side members 20 and 21 respectively. Inturned flanges 28' and 29' on the vertical sections 28 and 29 provide supporting surfaces as extensions of the flanges 40 and 40a for the gate 18 in open position. The said flanges 40 and 40a extend at an incline corresponding to and forming continuations of ledges 37 and 38 and thus the sliding gate slides from closed to open position along continuously extending sloping runways. The end ledge 39 is beveled at 39a to ease the gate to its closing position and compensate for any unevenness or sagging of the leading edge of the said gate.

The upper transverse member 23 is reinforced on its under side by an angle shaped member 41 having one flange underlying the member 23 and the other flange 42 lying normal thereto. The trailing end of the gate is flanged upwardly at 43 and secured thereto are lugs 44 which are apertured for receiving a pivot 45 for making connection with operating mechanism, as will be described.

The operating mechanism includes a rotatable shaft 46 which is journaled in bearings 47 that are located at each side of the framing and preferably consisting of short lengths of tubes welded as at 48 to the side framing members and at 49 to an angle time member 50 which extends transversely between the side framing members and welded thereto at 51 and 52. Arms 53 are non-rotatably mounted on the shaft 46 and pivotally connecting said arms and the lugs 44 are pairs of links 54—54. The outer end of each arm is apertured at 55 to receive pivots 56 for the purpose of making connection with one end of the linkage formed by arms 54. The linkage which consists of the pair of links 54 straddles the arms 53 and the lugs 44 and pivotally unites with said respective members by means of the pivots 45 and 56. The pivots 45 and 56 preferably consist of headless pins held in place on the links by welding as at 57 to provide an integrated link assembly at each arm.

The shaft 46 is preferably of non-circular shape and at its inner end is fitted with a flanged circular bushing 58 held in axial relation on the shaft by a headless pin 59 and at the opposite end there is provided an operating head 60 having a hub portion 61 of circular shape forming a bearing for the shaft. The arms 53 are provided with hublike portions 62—62 each having a non-circular opening 62', FIG. 8, for receiving the correspondingly shaped shaft 46 to provide for non-rotatable mounting thereon. The hublike portions 62—62 are spaced axially from each other by a hollow tubular spacer 63 and said spacer is united with the hubs of the arms by welding as at 64.

The pair of arms when integrally connected with the spacer 63 by means of welding function as a unitary member and the assembly as composed by the arms and spacer 63 is held in axial alignment on the shaft between the bushing 58 and the hub portion 61 of the head 60.

The arm and linkage when in extended position as seen in FIGS. 2 and 4 operate as struts between the shaft and gate to maintain the gate in closed position and when in extended position the arms rest on the tie member 50 with the axis 65 of pivot pin 56 lying slightly below and beyond a straight line joining the axis 46a of the shaft 46 with the axis 66 of pivot 45.

Each arm 53 is provided with a stop lug 67 adapted to engage with the tie member 50 to limit rotation of the shaft and thereby limit the extent of opening movement possible by rotation of the shaft. While the opening movement of the gate is thus limited when operable by means of the shaft rotation, provision is made for moving the gate beyond and above the slot in order to provide access to the ledges for cleaning purposes. The arrangement for this supplementary movement of the gate is effected through a provision allowing for a limited upward and outward movement of the trailing edge of the gate and to this end the linkage 54 is swingable about the pivot 56 to the position shown in FIG. 5. The extent of supplementary movement so provided is limited by stop means 68 which engage with the linkage 54 and thereby limit the extent of swinging movement of the linkage. Each stop means 68 preferably consists of a plate member 69 welded at 70 to the related lugs 44 and having ends 71 projecting beyond the sides of the lugs to seat against the edge surfaces 72 of the linkage.

The operating head 60 which is provided with a plurality of socket portions 73 for accommodating a removable bar (not shown), is also provided with a bracket portion 74 having a wall 75 spaced appreciably from the axis of rotation of the shaft and has a key-shaped aperture at 76 to accommodate therethrough a key-shaped portion 77 of a sealing pin 78. The sealing pin 78 includes at one end a handle portion 79 and at its opposite end is formed with a section 80 of circular shape which is adapted to seat in an opening 81 formed in the head. The wall 75 is united with the body of the operating head by means of upper and lower walls 82 and 83 which each include apertures 84 for receiving a sealing ribbon. The key-shaped portion 77 of the sealing pin is also pertured at 85 to align with the walls 82 and 83 when the sealing pin is in locking position thereby allowing for insertion of the sealing ribbon through aperture 84 in either of the walls 82 or 83 and through the aperture 85 of the sealing pin.

The sealing pin is mounted for axial movement in bracket plates 86—86 and outward movement of the pin is limited by a stop plate 87.

Shields in the form of inclined shedding plates 88 and 89 extend along the longitudinal side edges of the gate and serve to maintain the gate against upward movement and also operate as sealing means to guard against leakage. The said plates 88 and 89 terminate short of the end of the opening to provide escapement passages to allow flow of lading and prevent packing of lading in the corners of the opening adjacent the leading end of the gate when the latter moves to closed position.

A groove 90 is provided along the inner longitudinal side edge of the frame for receiving one side of the frame of a removable extension chute indicated conventionally at 91. The groove is preferably formed by two plates 92 and 93 welded together and to the outstanding lower marginal flange of the inner frame member at 94. The plate 93 is disposed in alignment with the lower flange 36 of the transverse member 24 and this provides for a groove opening on two adjacent sides of the frame as seen in FIG. 5.

Assuming the gate is in closed position, the opening operation is effected by first withdrawing the sealing bolt and thereafter imparting a partial rotation of the shaft in a clockwise direction as viewed in FIG. 2 until the stop lugs abut the tie member when the gate then reaches the maximum open position possible by rotation of the shaft. Should further opening of the gate be indicated, as sometimes necessary for cleaning purposes, the gate is moved bodily with the trailing end moving upwardly with the linkage swinging about the pivotal axis with the arms as seen in FIG. 5 and the underside of the gate 18 spaced, as by a block 95, above the surface of the flange 28'. With the insertion of a block 95 between the gate 18 and each flange 28' and 29' the entire gate is raised above the level of the slot and it is then possible to gain access to the runways for cleaning the same of any residue of lading resting thereon.

This accessibility for cleaning purposes is of special importance when transferring a car from one type of service to another as it is necessary that complete cleaning of the car be effected to avoid contamination of the lading.

Even though the gate be completely withdrawn to its fully extending portion including the supplementary travel provided by the swinging movement of the linkage, the closing is effected in one continuous operation by rotation of the shaft in an anticlockwise direction.

FIGS. 11 to 17 inclusive show another hopper outlet construction having a modified gate operating mechanism and a modified sealing pin construction for preventing unauthorized operation of the gate. In these figures of the drawings the car structure proper is indicated by a center sill 100 and a hopper 102 is disposed adjacent said center sill and between it and a side wall of the car (not shown). The hoppers are generally arranged in pairs in transversely aligned relation on opposite sides of the center sill 100 but, as each hopper is of similar construction, the description herein will be confined to only one of such hoppers.

The hopper 102 includes inner and outer side walls indicated at 103 and 104 which meet with oppositely sloping walls 105 and 106 to form a four-sided load containing hopper.

The lower marginal edges of the walls 103, 104, 105 and 106 are spaced apart to define a discharge area 107. Surrounding the lower portion of the hopper is a framing structure 108 which includes walls having sections 109, 110, 111 and 112 disposed to overlie the walls 103, 104, 105 and 106 of the hopper 102. The walls 109, 110 and 111 are extended downwardly as at 113, 114 and 115 for attachment thereto of rail members 116, 117 and 118 which in turn underlie a sliding gate 119 when in closed position.

The frame structure 108 is extended for an appreciable distance below the level of the gate 119 to form a chutelike enclosure 120 for confining the flow of lading to a restricted opening 121.

The enclosure 120 is formed in part by extending the wall 113 vertically downwardly, as shown in FIG. 14, and providing inwardly inclined walls 122, 123 and 124. The walls 122 and 123 lead downwardly from a location adjacent the upper surfaces of rail members 118 and 117, respectively, and the member 124, which extends transversely between inclined wall 123 and wall 113, is flanged at its upper margin as at 125 to underlie the gate 119. The flange 125 is spaced from the marginal edge 126 of the upper wall 112 to provide a slotted opening 127 through which the trailing end of the gate 119 extends.

Extension rails 128 and 129 are provided for supporting the gate 119 in open position. One of the extension rails 128 is secured to the wall 113 and the other extension rail 129 is secured to the oppositely facing wall 114. The rail members 128 and 129 are preferably of channel shape with upper and lower flanges as indicated at 130 and 131. The upper flanges 130 extend inwardly in such manner that they form supports for the gate 119.

At the outer ends of the extension rails 128 and 129 there are provided bearings 132—132 in which an operating shaft 133 is journaled for moving the gate 119 by a rotational movement of the shaft 133. Non-rotatably mounted on the shaft 133 are arms 134—134 which are disposed in alignment with arms 135—135 non-rotatably mounted on an operated shaft 136 which in turn is journaled in bearings 137—137 carried by the gate 119 at its trailing end. The arms 134—134 and 135—135 of the respective shafts 133 and 136 are interconnected by elongated links 138—138 by means of pivots 139—139 and 140—140. The linkages 138—138 preferably consists of pairs of plates 141—141 spaced apart to straddle the respective arms 134—134 and 135—135. The plates 141—141 are transversely united adjacent each pivotal connection by tie plates 142—142.

The gate 119 is preferably flanged upwardly to present an inclined wall 143 at its trailing edge and to this wall are secured the bearing members 137—137 by welding or other suitable means. The outer edge of each bearing member 137 provides a stop shoulder 146 to engage with an abutment 147 formed on each arm 135 to limit swinging movement of the operated shaft 136 in relation to the gate 119 for a purpose that will be pointed out hereinafter.

The overcenter movement of the linkages 138—138 is limited by bearing contact between the under sides of the tie plates 142—142 and the body portions of arms 134—134 and 135—135 and further by bearing contact between the under sides of the plates 141—141 and the upper surface of a flange 149 of an angle shaped tie member 150 which extends transversely between the rail extensions 128 and 129 and is welded thereto at its ends.

Rotation of the shaft 133 is effected through the medium of an operating head 152 which is non-rotatably associated therewith. It includes a series of openings 153 for receiving a removable operating bar 154 as shown in FIG. 11. The shaft 133 is preferably of non-circular shape and, to provide a circularly shaped journal bearing, the inner end of the operating head 152 is provided with a circularly shaped hub portion 155, FIG. 13, which fits into the adjacent bearing 132. Similarly the opposite end of the operating shaft 133 is fitted with a circularly shaped sleeve member 156 which fits into its bearing 132. The arms 134—134 are extensions of hubs 157—157 which fit over the square operating shaft 133 and are held against axial outward movement by the ends of hub portion 155 and sleeve member 156 and against inward movement by a tubular member 158 which is welded to the respective hub portions 157—157 so that they function as a unitary structure together with arms 134—134.

The movement of the gate 119 in an opening direction, as will be understood, is effected by winding the linkages 138—138 around the hubs 157. The closing operation of the gate 119 is effected by rotation of the operating shaft 133 in the opposite direction. In order to efficiently effect the opening of the gate 119 it is desirable that the linkages 138—138 remain in the enfolded state around the operating shaft 133 until such time as the pivotal connections 139—139 attain their maximum lifting position with the upward movement thereof limited by reason of the contact between stop shoulders 146 and abutments 147.

The retention of the linkages 138—138 in the enfolded state is effected by providing transverse circularly shaped segmental bearing sections 159—159 on the plates 141—141 and, during partial relation of the operating shaft 133, retaining the outer peripheries 160 thereof in engagement with seating faces of plates 161—161 and 162—162 extending horizontally and vertically at the outer ends of the extension rails 128 and 129 as seen in FIG. 12.

The segmental bearing sections 159 extend laterally from the outer plate 141 of each linkage 138. They are adapted to have bearing contact with the plates 161 and 162 which in turn are welded to the bearings 132—132 Since the plates 161—161 are horizontally disposed and the plates 162—162 are vertically disposed, they provide control for slightly more than 90° of shaft rotation with the linkages 138—138 in the enfolded state. Because the operated shaft 136 reaches the arrested position in the course of the opening movement of the gate 119 it will be understood that the arms 135—135 may be considered as rigid rearward extensions of the gate 119. Thus further continued movement of the gate 119 in the closing direction may be effected by angular opening movement between the linkages 138—138 and the arms 134–135 now permitted by reason of the linkages 138—138 having been released from their enfolded state as described in more detail in the application of which this application is a division.

Should there be an appreciable resistance to the closing movement of the gate 119, the operated shaft 136 and its associated linkages 138—138 will remain in the arrested position until such time as the linkages 138—138 and arms 135—135 have attained the overcenter toggle locked position as seen in FIG. 15. Upon continued rotation of the operating shaft 133 in the closing direction, linkages 138—138 and arms 135—135 will function as rigid arms pivoting about pivots 139—139 to open the angle between the linkages 138—138 and arms 134—134 until the operating mechanism finally assumes the overcenter toggle locked position as seen in FIG. 12. With a freely movable gate 119 the linkages 138—138 and arms 135—135 actually assume the position shown in FIG. 15 during closing movement of the gate 119 as the weight of the arms 135—135 exerts a downward thrust. Rotation of the operating shaft 133 in a gate opening direction is limited by engagement between the arms 134 and the edge 164 of the upper flange 149 of the time member 150.

For retaining the operating mechanism in final locking position, as shown in FIGS. 12 and 13, with the gate 119 in closed position, there is provided a T-shaped sliding bolt 165 which is adapted to extend into a socket 166 formed in one of the sides of the operating head 152. The sliding bolt 165 is provided with a depending handle 169, forming the stem of the T-shape, having an aperture 170 for the reception of a sealing ribbon 171. The bolt 165, which is axially movable in spaced bearings 172 and 173, actually seats on the upper flanges 174 of angle shaped brackets 175—175 which are positioned with vertically disposed flanges 176 in back to back relation with an intervening space 177 therebetween to accommodate the handle 169 of the sealing bolt 165. The flanges 176 are apertured at 178—178 to register with the aperture 170 of the handle 169 for receiving the sealing ribbon 171 therethrough.

The arrangement of the sliding bolt 165, FIG. 16, and its supporting brackets 175—175 and bearings 172 and 173 is such that the bolt 165 can only be inserted prior to the assembly of the operating head 152 and is held in place by the latter. In order to allow insertion of the bolt 165 the bearing plate 173 is formed with a semi-circular aperture 179 open at the lower part thereof, as seen in FIG. 17, to allow insertion of the sealing bolt 165 at a downward angle as seen in FIG. 16 prior to the assembly of the operating head 152 on the operating shaft 133. The bolt 165, having been inserted at an angle as indicated, is then seated on the intermediate bearing surfaces of the flanges 174 to assume its axial operating position and is retracted to enter the semi-circular aperture 179 of bearing plate 172. The handle 169 is positioned to abut the plate 172 while the bolt 165 is still held in the bearing plate 173. Axial movement of the sliding bolt 165 is then limited in one direction by the engagement between the handle 169 and plate 172. Movement in the opposite direction is limited by the end 180 of the bolt 165 engaging the bottom 181 of the socket 166 on the operating head 152.

The arrangement of the parts is such that assembly of the structure is readily effected as follows:

Assuming that the sliding sealing bolt 165 has been applied as above described and the gate 119 and its associated shaft 136 and linkages 138—138 are made up as a sub-assembly, the operating shaft 133 is now inserted through the bearings 132—132 and threaded through the sleeve member 156 which is held in place by a headless pin 182, FIG. 11. The operating head 152 is slipped on the opposite end of the operating shaft 133 with the hub portion 155 seating in the adjacent bearing 132. The operating head 152 is then held against axial movement on the shaft 133 by a small rivet 183 extending through the head 152 and shaft 133.

It will thus be noted that the entire assembly, or conversely disassembly, of the gate 119 and its associated operating shaft 133 and locking bolt 165 is readily effected by the removal of one rivet, i.e., the rivet 183.

The gate 119 is prevented from upward bouncing by means of bracket plates 184 which extend under the horizontal flanges 130 of the extension rails 128 and 129. Adjacent the lower margin of the hopper chute 126 provision is made for receiving and holding a removable extension chute commonly known as a "boot" (not shown). This includes grooves located on two adjacent sides of the frame as seen at 185 and 186 and laterally extending flanges on the other two adjacent sides as seen at 187 and 188.

What is claimed as new is:

1. In a discharge outlet assembly for a hopper having a discharge opening and a sliding gate for the opening:
   (a) means for moving the gate including a rotatable shaft and interengaging means between the shaft and gate for moving the latter by rotation of the shaft,
   (b) an operating member on the shaft, and
   (c) an elongated sealing pin lineally movable along its axis in the general direction of movement of the gate and adapted to be moved transversely of the axis of rotation of the shaft into the path of movement of a part of the operating member for preventing rotation of the shaft.

2. In a discharge outlet assembly for a hopper having a discharge opening and a sliding gate for the opening:
   (a) means for moving the gate including a rotatable shaft and interengaging means between the shaft and gate for moving the latter by rotation of the shaft,
   (b) a bracket on the shaft including apertured spaced walls disposed at different distances from the axis of rotation of the shaft.
   (c) an elongated sealing pin lineally movable along its axis on and reacting against said outlet assembly to extend through the apertures in both of said spaced walls,
   (d) said pin having a key-shaped portion extending beyond the main body of the pin and apertured to receive a sealing ribbon, and lying between the spaced walls on said bracket when the pin is in sealing position, and
   (e) other walls connecting the respective first named walls, said last named walls having apertures disposed substantially in alignment with the apertures of the key to admit a sealing ribbon therethrough.

3. In combination:
   (a) a hopper having a discharge opening, a sliding gate for the opening, and means for moving the gate;
   (b) said gate moving means including a rotatable operating shaft and interengaging mechanism between the shaft and gate,
   (c) means for locking the shaft including an operating head having an arcuately shaped section and a socket leading into said section at an angle normal to the axis of rotation of the shaft,
   (d) an elongated sliding bolt having a locking end portion lineally movable along its axis within the socket, said bolt being of T-shape with a handle portion formed by the stem of the T,
   (e) guiding means for the bolt including walls on opposite sides of the handle portion apertured for the passage of the ends of the bolt therethrough,
   (f) one of said walls being located adjacent the socket and having the aperture extended below the level of the bolt to allow tilting of the latter for first inserting the locking end of the said bolt therethrough and thereafter retracting the bolt into the aperture of the other guiding wall,
   (g) the other wall forming an abutment to engage the handle and limit movement of the bolt in one direction, and
   (h) means for limiting movement of the bolt in the opposite direction including the bottom wall of the socket on the operating head disposed in alignment with the end of the bolt.

4. The invention, as set forth in claim 3, wherein supporting brackets including spaced walls are located between the end guiding walls for receiving the handle therebetween, and apertures are provided in the spaced bracket walls and in the handle for accommodating a sealing ribbon therethrough.

5. A discharge outlet assembly comprising, in combination:
   (a) a foursided chute-like enclosure defining a discharge opening,
   (b) a sliding gate for said opening, (c) said gate projecting beyond one of the sides of said enclosure to provide a portion projecting beyond said one side when said gate is in closed position, (d) frame side members on opposite sides of said enclosure mounting runways extending toward each other on which said gate is slidable, (e) said frame members and runways extending outwardly of said one side of said enclosure for supporting said gate in open position, (f) a shaft rotatably mounted on said frame side members adjacent the distal ends thereof, (g) connecting means between said gate and said shaft whereby said gate is moved between closed and open positions depending upon the direction of rotation of said shaft, (h) an operating head on said shaft having a radially extending socket portion adjacent the outer side of one of said side members and having a radially extending opening, (i) sealing pin support means mounted on said outer side of said one side member adjacent said operating head, and (j) an elongated sealing pin lineally slidable along its axis on said support means into said opening in said socket portion to prevent rotation of said shaft.

6. The invention, as set forth in claim 5, wherein the sealing pin support means comprises a pair of laterally extending flange members, and a third flange member extends laterally from the outer side of the one side member and constitutes a stop to hold the sealing pin captive.

7. The invention, as set forth in claim 5, wherein:

(a) the sealing pin is an L-shaped member with the long arm mounted on the support means and having the end insertable in the opening in the socket portion key shaped having an aperture, and (b) said socket portion has apertured walls on opposite sides of said key shaped end registering with an aperture therein for accommodating a sealing ribbon therethrough.

8. The invention, as set forth in claim 7, wherein:

(a) the support means comprises a pair of spaced apart plates in which the long arm is rotatably and axially slidably mounted, and (b) a stop plate mounted on the outer side of the one side member cooperates with the short arm of the sealing pin to limit its outward movement after the key shaped end is withdrawn from the socket portion.

9. The invention, as set forth in claim 5, wherein:

(a) the sealing pin is a T-shaped member with the head mounted on the support means and having one end insertable in the opening in the socket portion, and (b) the support means comprises a pair of spaced apart plates arranged to receive therebetween the stem of said T-shaped sealing pin when its head is inserted as aforesaid.

10. The invention, as set forth in claim 9, wherein the support plates and stem of the T-shaped sealing pin have registered apertures for accommodating a sealing ribbon therethrough.

11. The invention, as set forth in claim 9, wherein a stop plate mounted on the outer side of the one side member cooperates with the other end of the head of the T-shaped sealing pin to limit its outward movement after the one end thereof has been withdrawn from the aperture in the socket portion.

12. In combination, a hopper structure having, (a) a discharge opening, (b) a sliding gate for the opening, (c) means for moving the gate including:

(d) a rotatable shaft and interengaging mechanism between the shaft and gate;

(e) means for locking the shaft against rotation including:

(f) a seat fixedly associated with the shaft and located at an appreciable distance from its axis of rotation, (g) an elongated bolt carried by the hopper structure and lineally movable along its axis in a direction substantially normal to the axis of the shaft to engage with the seat on the shaft, (h) a stem extending radially from the bolt, (i) an abutment wall disposed below the level of the bolt engageable with the stem of the bolt for preventing axial movement of the bolt, (j) said stem of the bolt being radially swingable above the abutment wall to allow axial movement of the bolt beyond the abutment wall, (k) apertures in the stem of the bolt and the abutment wall respectively, (l) said apertures being adapted to register in aligned relation when the bolt is in operative locking position with the shaft whereby a sealing ribbon may be threaded through the apertures of the respective bolt and abutment wall.

References Cited in the file of this patent

UNITED STATES PATENTS

| | | |
|---|---|---|
| 685,371 | Davis | Oct. 29, 1901 |
| 2,712,290 | Dath | July 5, 1955 |
| 2,749,851 | Dorey | June 12, 1956 |
| 2,751,859 | Dath | June 26, 1956 |
| 2,791,973 | Dorey | May 14, 1957 |
| 2,810,356 | Dath | Oct. 22, 1957 |
| 2,859,707 | Dorey | Nov. 11, 1958 |